United States Patent [19]

Shamie

[11] Patent Number: 4,743,043
[45] Date of Patent: May 10, 1988

[54] REMOVABLE STROLLER GUARD RAIL

[76] Inventor: Louis Shamie, 972 Dean Street, Brooklyn, N.Y. 11238

[21] Appl. No.: 932,914

[22] Filed: Nov. 19, 1986

[51] Int. Cl.$^4$ .............................. B62B 9/24; B62B 9/12
[52] U.S. Cl. ...................................... 280/644; 280/42; 280/650; 297/488; 297/469
[58] Field of Search ................. 280/644, 642, 42, 650, 280/647, 658, 47.38; 297/154, 487, 488, 464, 469; 24/489, 516, 518; 108/78, 90

[56] References Cited

U.S. PATENT DOCUMENTS

| | | | |
|---|---|---|---|
| 3,146,738 | 9/1964 | Telarico | 297/154 X |
| 4,030,769 | 6/1977 | Peng et al. | 280/42 |
| 4,293,144 | 10/1981 | Ida | 280/644 |
| 4,317,581 | 3/1982 | Kassai | 280/644 |
| 4,586,721 | 5/1986 | Harada et al. | 280/30 |

Primary Examiner—David M. Mitchell
Assistant Examiner—Tamara L. Finlay
Attorney, Agent, or Firm—Peter C. Michalos

[57] ABSTRACT

A removable and foldable guard rail for a collapsible stroller having spaced apart side rails comprises an articulated rail member with opposite ends and a latch assembly pivotally connected to each of the opposite ends of the rail member. Each latch assembly has a latch plate with a semicircular recess for receiving one of the side tubes. A hook member is pivotally mounted to each latch plate and can be engaged over the side rail to capture the side rail in the latch assembly.

18 Claims, 2 Drawing Sheets

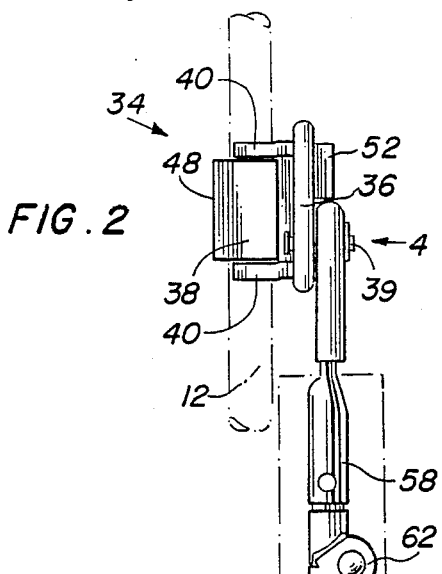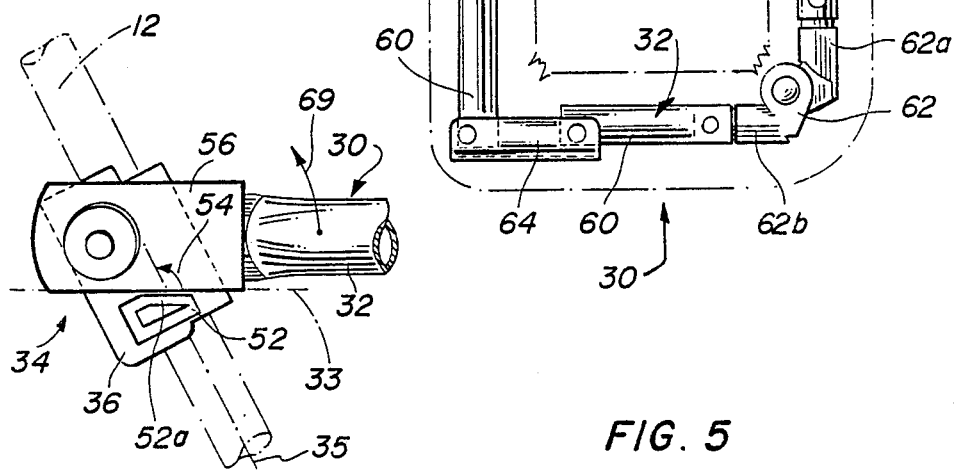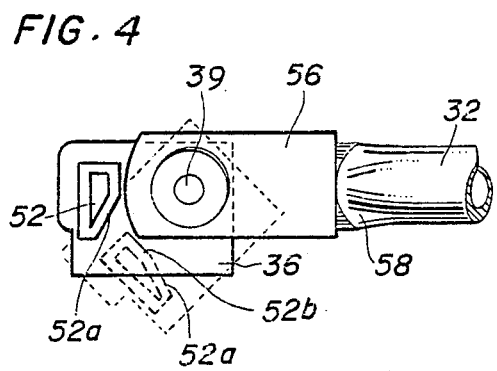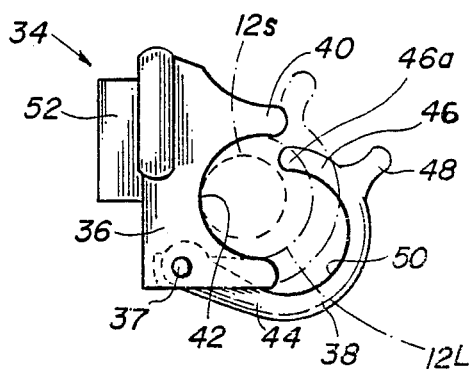

REMOVABLE STROLLER GUARD RAIL

FIELD AND BACKGROUND OF THE INVENTION

The present invention relates in general to strollers, and in particular to a new and useful guard rail that can be conveniently attached and removed from a stroller, in particular a so-called umbrella stroller, and which folds with the stroller.

Umbrella strollers have been available for a considerable length of time. They generally comprise a pair of spaced apart side frames which are interconnected by bottom and back scissor frames. An articulated spreader bar is connected between the frames to hold the frames apart and a pliable fabric is stretched between the frames to form the stroller seat and stroller back for supporting an infant.

The unbrella strollers are generally folded by pivoting two parts of the spreader bar so that the scissor frames collapse to permit the side frames to move together. The side frames are then folded once more to yield a compact folded structure.

In the past it has been generally difficult or impossible to provide such umbrella strollers with a functional guard rail which extends between the frames and across the front of the child above the child's legs. Such guard rails are generally padded and are advantageous additions to a stroller since they restrict the forward movement of the child and provide an added degree of safety and convenience.

SUMMARY OF THE INVENTION

The present invention is drawn to a removable flexible guard rail which can easily be connected between side frames of an umbrella stroller. The guard rail is structured so that it can fold along with the stroller. The guard rail is pivotally mounted to the side frames so that even with the stroller in its unfolded use position, the guard rail can be raised and lowered.

The guard rail of the present invention can also be used with any type of stroller having side frame tubes.

Accordingly, an object of the present invention is to provide a stroller guard rail which comprises an articulated rail member having opposite ends with a latch assembly at each end which is engageable with a side tube of a stroller. With the latch assemblies engaged to opposite side tubes of a stroller, the articulated rail member extends across the seating area of the stroller.

A further object of the invention is to provide a removable guard rail which is simple in design, rugged in constructions and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a top plan view showing the use and folded position for the inventive guard rail, with part of its padded cover removed for clarity;

FIG. 3 is a partial side elevational detail taken in the direction of arrow 3 in FIG. 2;

FIG. 4 is a view similar to FIG. 3 taken in the direction of arrow 4 in FIG. 2; and FIG. 5 is a top plan view showing the latch assembly of the inventive guard rail.

DESCRIPTION OF THE PREFERRED EMBODIMENT

Figure 1:
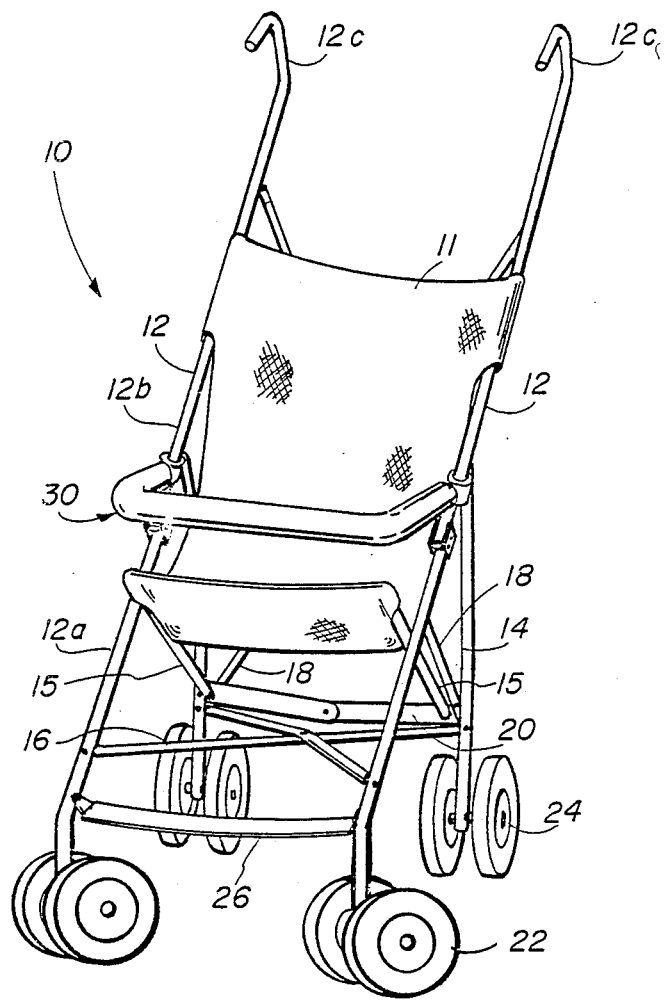
FIG. 1 is a perspective view showing a typical umbrella stroller with the inventive guard rail attached.

Referring to the drawings in particular, the invention embodied in FIG. 1 comprises a removable guard rail generally designated 30 which can be readily mounted to side frames of a stroller generally designated 10.

Stroller 10 is known as an "umbrella" stroller. The term umbrella is used due to the hook-shaped handles of the stroller that resemble umbrella handles.

Umbrella stroller 10 comprises a pair of spaced apart side frames each having a main side tube 12 and a rear side tube 14. Tubes 12 and 14 are pivotally connected to each other and respectively carry the front wheels 22 and the rear wheels 24 of the stroller.

The main side tubes 12 each comprise a lower tube portion 12a which is pivotally mounted to an upper tube portion 12b. The upper portion carries the hook-shaped handles 12c and the lower portion carries the front wheels 22.

A lower scissor frame 16 and a back scissor 18 interconnect the side tubes 12,14. A stretcher bar 20 having two parts which are pivotally mounted together, is pivotally mounted between the rear side tubes 14 to hold the side frames apart. In this use position, a flexible fabric seat plus back combination 11 is stretched across the side frames to provide a seating area for an infant. A seat tube 15 is articulated between the rear and main side tubes to support the front edge of the seat.

A flexible foot strap 26 is stretched between the lower portions 12a of the side tubes 12. The stroller 10 is of conventional and readily available design so that additional details will not be provided here. An foldable stroller having side tubes that are at least partly exposed can be used in combination with the present invention.

Turning now to to FIG. 2, the guard rail 30 comprises an articulated rail member 32 having a latch assembly 34 connected to each end. The right hand portion of FIG. 2 shows the position that the guard rail will take in use while the left hand portion of FIG. 2 shows the position of the guard rail when it is folded aong with the rest of the stroller.

Latch assembies 34 are identical mirror images of each other. For this reason only one of the latches will be discussed in detail.

As shown in FIGS. 2 and 5, latch assembly 34 comprises a latch plate 36 which is povitally connected to one end of the articulated rail member 32 by a pivot pin or rivet 39.

Latch plate 36 carries a pair of spaced apart end flanges 40 (left hand portion of FIG. 2) which each define curved, preferably semicircular, recesses 42. (FIG. 5 and right hand portion of FIG. 2). The diameter of recess 42 is selected to accommodate the largest diameter side rail 12L shown in dot-dashed line in FIG. 5. The same recess 42 can also accommodate a much smaller diameter side rail 12S shown in dash-dotted line in FIG. 5.

A latch hook 38 is pivotally mounted at pin 37 to the latch plate 36 and between the flanges 40. Hook 38 includes a pair of legs 44 and 46 which define a curved, and again substantially semicircular recess 50.

The outer surface of latch hook 38 carries an actuating tab 48 which extends the full length of the hook 38.

To engage the latch assembly 34 onto a side rail 12,12S or 12L, the flanges 40 are first positioned against the side rails to bring the side rail into the recess 42. The hook 38, having first been pivoted away from the recess 42, is then pivoted over the side rail to bring it into its phantom line position in FIG. 5. To accomplish this however, the free end 46a of hook 38 which is remote from the pivot connection 37 is squeezed over the outer diameter of the side rail. The leg 46 of hook 38 is chosen to be long enough so that for any rail sized between the small diameter rail 12S and the large diameter rail 12L, the hook must be forcefully pressed over the side rail. The hook 38 is made of resilient, preferably plastic, material so that it can bend to permit this movement.

The recess 50 is also selected so that it has a cross section which is slightly more than half a circle.

By providing these features, the hook 38 in its seated position firmly embraces and locks to the side rail. An inadvertant disassembly of the guard rail from the stroller thus become difficult or impossible.

FIG. 3 shows the use position for the guard rail 30. In this position, the plane parallel to the articulated latch member, shown at 33 should be at an obtuse angle 54 to the longitudinal axis 35 of the side tube 12. To accomplish this, the latch plate 36 of each latch assembly 34 includes a polygonal stop projection 52. Stop projection 52 includes a side 52a which supports the lower straight edge of an end boot 56 at the end of the rail member 32. This establishes the obtuse angle 54.

To pivot the articulated rail member 32 upwardly, as shown in FIG. 4, a top side 52Sb must squeeze past a corner of the boot 56. The latch plate 36 can then be brought to a position which is substantially parallel to the plane of the articulated rail member 32. The relative position between topside 52b and pivot pin 37 causes this engagement between the projection 52 and the corner of boot 56. Thus functions to hold the rail in its up position once it is moved into its up position. The direction of pivoting for moving guard rail 30 into its up position is shown at arrow 69 in FIG. 3.

Referring once more to FIG. 2, the articulated rail member 32 comprises a pair of end tubes 58 which each have flattened ends which are inserted into the boot 56. Pivot pin 39 extends through the boot and through the end of end tubes 58 for securing the boots to the end tubes.

A pair of middle tubes 60 are pivotally mounted to each other by a U-shaped center pivot hinge plate 64. 90° hinges 62 connect each of the middle tubes 60 to one of the end tubes 58. Each hinge 62 can move at least 90°. The hinge shown at FIG. 2 can actually move 180° but this entire pivotal amount is not necessary. The hinges 62 need only be movable from the position shown at the right of FIG. 2 to the position shown at the left of FIG. 2.

The U-shaped hinge plate 64 permits only about 90° movement between the center tubes 60 so that with the rail member in its use position, members 60 form a somewhat rigid bar across the front of the stroller seat. While the bar can be distorted slightly outwardly, it cannot be moved inwardly toward the seat or toward a child in the seat.

The hinges 62 are each made of two preferably plastic molded parts 62a and 62b. Each of these parts has a projecting post projecting into the hollow interior of tubes 58 and 60 respectively and are held there by fastening pins or rivets.

Most of the articulated rail member 32 is covered by a tubular resilient padded rail member cover 67. Cover 67 may for example comprise an interior tube of firm form rubber covered on the outside with a vinyl sleeve.

While a specific embodiment of the invention has been shown and described in detail to illustrate the application of the principles of the invention, it will be understood that the invention may be embodied otherwise without departing from such principles.

What is claimed is:

1. A removable foldable guard rail for a collapsible stroller having opposite side tubes, comprising an articulated rail member having opposite ends and a latch assembly pivotally connected to each of said opposite ends of said rail member, each latch assembly having hook means for receiving one of the side tubes for removably connecting the articulated rail member to and across the side tubes, whereby said rail member can be removed from the side tubes, each latch assembly comprising a latch plate pivotally mounted to one of said opposite ends of said articulated rail member, said hook means comprising a curved outwardly open recess in said latch plate and a latch hook pivotally mounted to said latch plate, said latch hook having a curved, inwardly open recess which forms with said outwardly open recess, a closed channel for a side tube of a stroller when said latch hook is pivoted into a closed position on said latch plate.

2. A guard rail according to claim 1, wherein said latch plate includes a pair of spaced apart end flanges each having a curved outwardly open recess forming said curved outwardly open recess of said hook means, said latch hook being pivotally mounted between said flanges.

3. A guard rail according to claim 2, wherein said latch hook includes an outwardly projecting actuating tab.

4. A guard rail according to claim 2, wherein said curved recesses are both circularly curved so that said channel has a circular cross section, said latch hook having a first leg pivotaly mounted to said latch plate and a second leg having a free end, said free end having a length so that with said latch hook pivoting away from its closed position, said free end extends into said circular cross section of said channel formed between said latch plate and latch hook when said latch hook is in its closed position.

5. A guard rail according to claim 2, wherein said latch plate includes a stop projection on a side thereof opposite from a side from which said flanges extend, stop projection having a side engageable against said lower edge of one of said opposite ends of said rail member for establishing an obtuse angle between said lower edge and a longitudinal axis of the curved recesses.

6. A guard rail according to claim 6, wherein said stop projection is polygonal, said opposite ends of said rail members each having a corner, each polygonal projection having a side for engaging one of said corners when said latch plate is pivoted on said rail member.

7. A guard rail according to claim 1, wherein said articulated rail member comprises a pair of end tubes each carrying one of said opposite ends of said rail member, a pair of middle tubes pivotally mounted to each other at one end thereof and each having an opposite end pivotally connected to one of said end tubes, and a padded tube over said end and middle tubes.

8. A guard rail according to claim 7, including a 90° hinge connected between each end tube and the middle tube to which it is pivotally connected, each 90° hinge being capable of at least 90° of pivoting between a straight line position where said end and middle tubes lie on a common line, to a 90° position where said end tubes extend perpendicularly to said middle tubes.

9. A guard rail according to claim 8, including a U-shaped pivot plate connected between said middle tubes for pivotally connecting said middle tubes to each other, said plate permitting 90° of movement between said middle tubes from a straight line position where said middle tubes extend along a single straight line, to a parallel position where said tubes extend parallel to each other.

10. A guard rail according to claim 9, wherein each end tube has a flattened end forming said opposite end of said rail member, and a boot over said flattened end, said latch assembly being pivotally mounted to said boot and to said flattened end.

11. A guard rail according to claim 10, wherein each latch assembly comprises a latch plate pivotally mounted to one of said opposite ends of said articulated rail member, said hook means comprising a curved outwardly open recess in said latch plate and a latch hook pivotally mounted to said latch plate, said latch hook having a curved inwardly open recess which forms with said outwardly open recess a closed channel for a side tube of a stroller when said latch hook is pivoted into a closed position on said latch plate.

12. A guard rail according to claim 1, wherein said latch plate includes a pair of spaced apart end flanges each having a curved outwardly open recess forming said curved outwardly open recess of said hook means, said latch hook being pivotally mounted between said flanges.

13. A guard rail according to claim 12, wherein said latch hook includes an outwardly projecting actuating tab.

14. A combination foldable stroller and removable guard rail comprising a pair of side frames each having a main side tube, a bottom scissor frame connected between said side frames, a back scissor frame connected between said side frames, said scissor frames permitting movement together and apart of said side frames, a spreader bar pivotally connected between said side frames for holding said side frames apart, a flexible fabric seat and back combination connected between said side frames, a latch assembly removably engagable around a portion of each main side tube, and an articulated rail member having opposite ends each pivotally connected to one latch assembly and extending between said side frames, said rail member having flattened opposite ends with lower edges, each latch assembly comprising a latch plate pivotally connected to each flattened opposite end of said rail member, said latch plate defining a semicircular recess, and a latch hook pivotally mounted to said latch plate and carrying a semicircular recess facing said semicircular recess of said latch plate for defining a closed channel around one of said main side tubes, said latch hook being pivotal away from said main side tube for opening said channel to release said latch assembly from said main side tube.

15. A combination according to claim 14, wherein said latch plate includes a stop projection extending from said latch plate on an opposite side thereof from said latch hook, said stop projection being engageable with said edge of said flattened end of said rail member for holding said edge at an obtuse angle with respect to a longitudinal axis of said main side tube.

16. A combination according to claim 15, wherein said articulated rail member comprises a pair of end tubes each carrying one of said flattened ends, 90° hinges connected to each end tube, a pair of middle tubes pivotally connected to each other and each connected to one of said 90° hinges.

17. A combination according to claim 16, incuding a further 90° hinge connected between said middle tubes.

18. A combination according to claim 17, wherein said further 90° hinge comprises a U-shaped plate pivotally connected to each middle tube.

* * * * *